US012641173B2

(12) United States Patent
   Yeo

(10) Patent No.: US 12,641,173 B2
(45) Date of Patent: May 26, 2026

(54) HOLDER FOR PORTABLE TERMINAL

(71) Applicant: Changki Yeo, Incheon (KR)

(72) Inventor: Changki Yeo, Incheon (KR)

( * ) Notice: Subject to any disclaimer, the term of this patent is extended or adjusted under 35 U.S.C. 154(b) by 292 days.

(21) Appl. No.: 18/332,983

(22) Filed: Jun. 12, 2023

(65) Prior Publication Data

US 2024/0333828 A1 Oct. 3, 2024

(30) Foreign Application Priority Data

Mar. 31, 2023 (KR) ........................ 10-2023-0042824

(51) Int. Cl.
   *H04M 1/02* (2006.01)
   *H04M 1/04* (2006.01)
(52) U.S. Cl.
   CPC ........... *H04M 1/0281* (2013.01); *H04M 1/04* (2013.01)
(58) Field of Classification Search
   CPC ................ A45F 5/10; A45F 2005/1006; A45F 2005/1013; A45F 2005/1066; A45F 2005/1073
   See application file for complete search history.

(56) References Cited

U.S. PATENT DOCUMENTS

| | | | | |
|---|---|---|---|---|
| 10,113,691 | B2 * | 10/2018 | Grieve | ................... F16M 13/06 |
| 10,244,854 | B1 * | 4/2019 | Haber | .................... H04B 1/385 |
| 10,638,627 | B1 * | 4/2020 | Stime | ..................... F16M 11/10 |
| 10,774,871 | B1 * | 9/2020 | Srour | ...................... F16C 11/12 |
| 10,895,345 | B2 * | 1/2021 | Lederer | ................. F16M 13/00 |

| | | | | |
|---|---|---|---|---|
| 10,972,596 | B1 * | 4/2021 | Blau | ........................ H04M 1/04 |
| 11,183,880 | B2 * | 11/2021 | Haber | ..................... H01F 27/02 |
| 11,530,779 | B2 * | 12/2022 | Epstein | .................. F16M 11/40 |
| 11,786,031 | B1 * | 10/2023 | Backus | ............... H04M 1/0281 |
| | | | | 224/577 |
| 12,016,450 | B2 * | 6/2024 | Backus | ................... H04M 1/04 |
| 12,367,434 | B2 * | 7/2025 | De Spong | ............. G06Q 10/06 |
| 2015/0257288 | A1 * | 9/2015 | Livernois | ............ H04B 1/3877 |
| | | | | 248/346.06 |
| 2020/0063915 | A1 * | 2/2020 | Lederer | .................. F16M 13/04 |
| 2021/0348716 | A1 * | 11/2021 | Lane | ...................... F16M 11/38 |
| 2022/0137491 | A1 * | 5/2022 | Stankie | .......... H04M 1/724092 |
| | | | | 396/428 |
| 2022/0159113 | A1 * | 5/2022 | Parish, Sr. | ............. H04M 1/04 |
| 2022/0304457 | A1 * | 9/2022 | Cornish | ................... A45F 5/00 |
| 2023/0396280 | A1 * | 12/2023 | Parsian | ................ G06F 1/1607 |
| 2024/0081515 | A1 * | 3/2024 | Backus | .................. G06F 1/166 |
| 2024/0219970 | A1 * | 7/2024 | Backus | ................. F16M 13/04 |
| 2024/0333828 | A1 * | 10/2024 | Yeo | ..................... H04M 1/0281 |
| 2025/0021134 | A1 * | 1/2025 | Yang | ..................... H05K 5/061 |
| 2025/0057304 | A1 * | 2/2025 | Backus | .................. G06F 1/166 |
| 2025/0107615 | A1 * | 4/2025 | Backus | ............... F16M 11/041 |

* cited by examiner

*Primary Examiner* — Patrick F Marinelli

(57) ABSTRACT

The present invention relates to a holder for portable terminal, wherein a guide plate comprises a first guide hole, and a second guide hole for inserting a fastening part and guiding a movement of the fastening part. A holder case comprises a draw-out hole that houses the guide plate and a strap therein through a lower opening, and draws out the fastening part. A movable plate is disposed on the upper surface of the holder case, and fastened to the fastening part on the lower surface, and operates away from or into contact with the holder case as the fastening part is drawn out or returned through the draw-out hole. A holder cover is attached to the guide plate and the holder case while closing the lower opening of the holder case.

4 Claims, 14 Drawing Sheets

HOLDER FOR PORTABLE TERMINAL

CROSS-REFERENCE TO RELATED APPLICATIONS

This application claims priority to and benefit of Korean Patent Application No. 10-2023-0042824 filed on Mar. 31, 2023, the disclosure of which is hereby incorporated by reference in its entirety.

BACKGROUND

(a) Field of the Invention

The present invention relates to a holder for portable terminal, and more particularly, to a holder for portable terminal that is attached to a mobile terminal and thus enables users to grip the mobile terminal stably.

(b) Description of the Related Art

A cellular phone, which is a type of portable terminal, is often used as one of personal communication means that enables voice communication and wireless communication while moving. In recent years, smart phones, tablet PCT, and the like, which are intelligent terminals where computer support functions such as Internet communication and multimedia functions are added in addition to voice communication, are mainly used.

Meanwhile, it is common for users to use a mobile terminal while gripping it in their hands. However, since portable terminals such as smart phones and tablet computers are wide in width due to large screens, users with small hands may find it inconvenient to grip and operate the portable terminal with one hand. When gripping and using the portable terminal, it may slip out of the user's hands, or when bumping into another person and dropping the portable terminal, it may cause breakage or failure of the portable terminal.

Therefore, a wide variety of accessory products capable of stably gripping or mounting the portable terminal are being used. However, due to the characteristics of the accessory market that the period during which new portable terminals are released has been gradually shortened and that the portable terminal accessories need to satisfy the diverse needs of consumers who are very sensitive to fashion, there is a need to develop accessory products that can provide more various functions with newer structures.

PRIOR ART DOCUMENT

Patent Document (Patent Document 0001) Korean Patent Registration No. 10-2408735 (published on Jun. 13, 2022).

SUMMARY OF THE INVENTION

It is an object of the present invention to provide a holder for portable terminal that enables users to grip the mobile terminal stably, and reduces the overall volume when not in use and thus does not interfere with the storage of the portable terminal.

In order to achieve the above object, a holder for portable terminal according to the present invention comprises a strap, a guide plate, a holder case, a marking part, a movable plate, and a holder cover. The strap is configured such that a fastening part is formed at one end of the intermediate part, and a stopper part is formed at the other end of the intermediate part. The guide plate comprises a first guide hole inserting the stopper part and guiding a movement of the stopper part accompanied by a movement of the fastening part, and a second guide hole having a width narrower than that of the first guide hole, communicating with the first guide hole, inserting the fastening part and guiding a movement of the fastening part. The holder case comprises a draw-out hole that houses the guide plate and the strap therein through the lower opening on the basis of a horizontal arrangement, and is formed on the upper surface to correspond to the second guide hole to draw out the fastening part. The marking part indicates a draw-out direction of the fastening part. The movable plate is disposed on the upper surface of the holder case and fastened to the fastening part on the lower surface, and operates away from or into contact with the holder case as the fastening part is drawn out or returned through the draw-out hole. The holder cover is attached to the guide plate and the holder case while closing the lower opening of the holder case.

In the holder for portable terminal according to the present invention can reduce the overall volume by overlapping the movable plate with the holder case when not in use, and the movable plate is separated from the holder case only when in use, so that the user can hold the portable terminal more stably.

In addition, in the holder for portable terminal according to the present invention, the movable plate is inserted into the draw-out hole of the holder case in a state where it is spaced apart from the holder case as necessary, so that the portable terminal can be conveniently mounted on the floor.

Further, the holder for portable terminal according to the present invention incorporates a permanent magnet, and can be easily detachably attached to a portable terminal having a magnetic body. Further, the holder for portable terminal according to the present invention can display advertisements on a movable plate, and thus has the effect of being used as a promotional product.

DETAILED DESCRIPTION OF THE EMBODIMENTS

Figure 1:
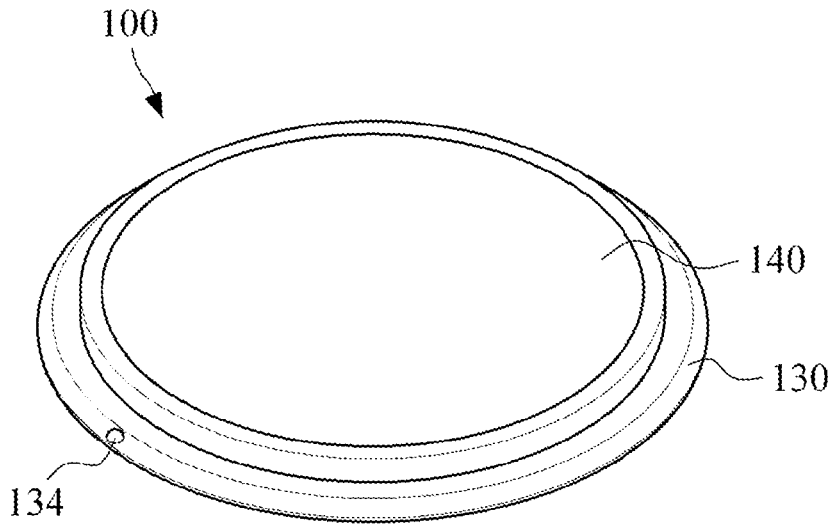
FIG. 1 is a perspective view of a holder for portable terminal according to an embodiment of the present invention.

Embodiments of the present invention will be described in detail with reference to the accompanying drawings. Here, the same reference numerals are used to indicate the same or similar elements, and detailed descriptions of well-known functions or configurations will be omitted since they would unnecessarily obscure the subject matters of the present invention.

Embodiments of the present invention are provided so that this disclosure will be thorough and complete, and will fully convey the scope of the invention to those skilled in the art. Accordingly, the shapes and sizes of elements in the drawings may be exaggerated for clarity. Here, terms indicating directions, such as 'top', 'bottom', 'left', and 'right', are for convenience of explanation and are merely illustrative.

Figure 2:
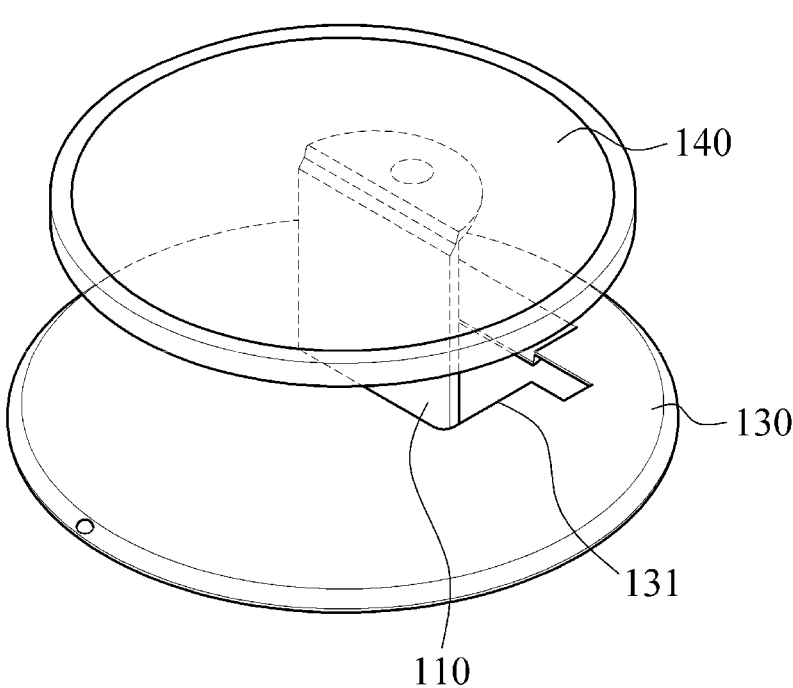
FIG. 2 is a perspective view showing a state in which the movable plate moves away from the holder case in FIG. 1 so that a finger can be inserted therein.
Figure 3:
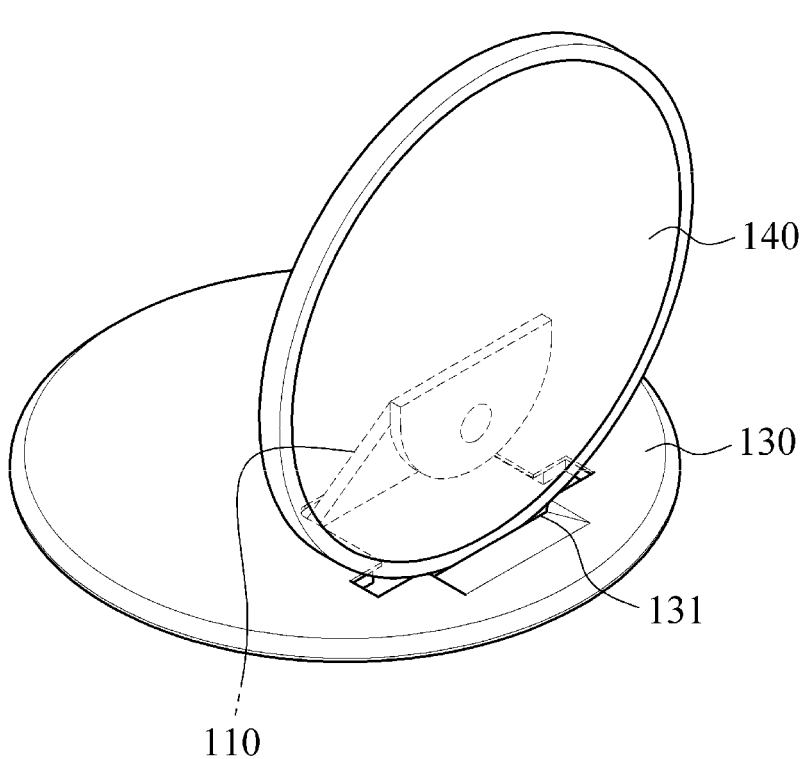
FIG. 3 is a perspective view showing a state in which a part of the movable plate spaced apart from the holder case in FIG. 1 is inserted into the draw-out hole of the holder case.
Figure 4:
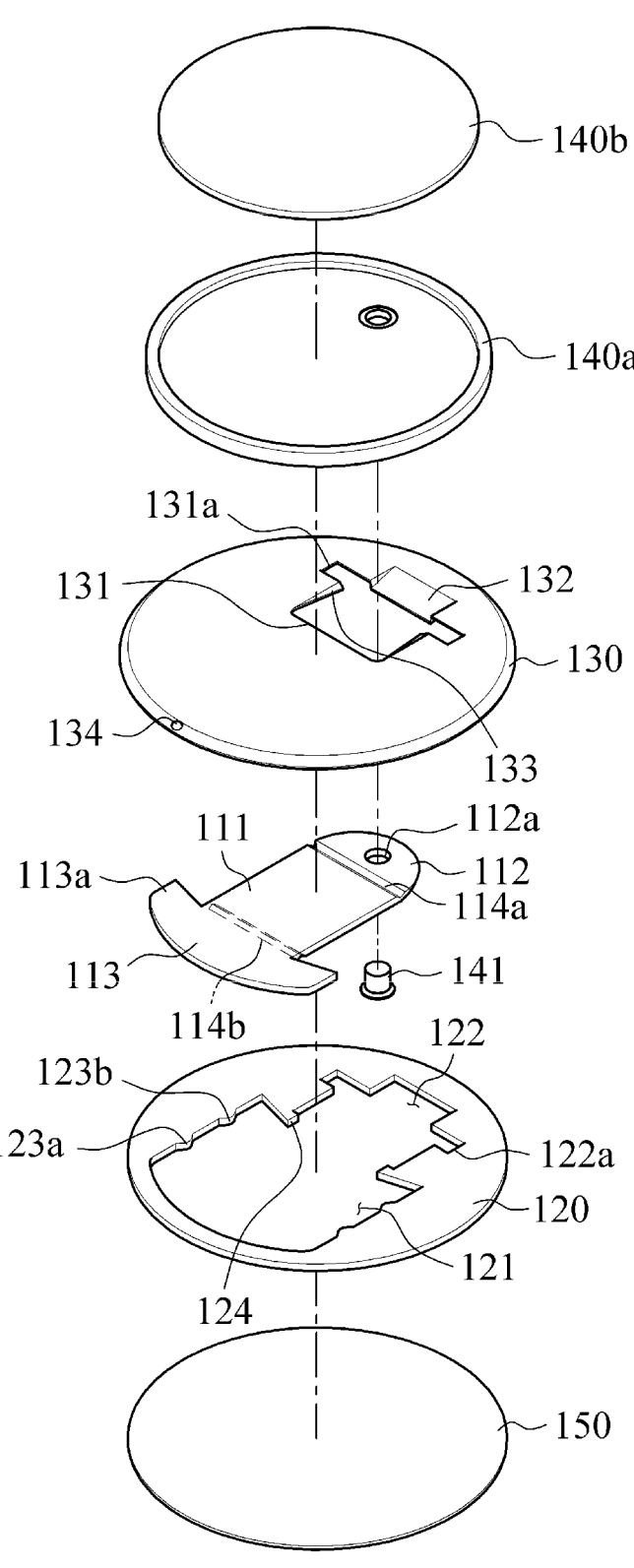
FIG. 4 is an exploded perspective view of FIG. 1.
Figure 5:
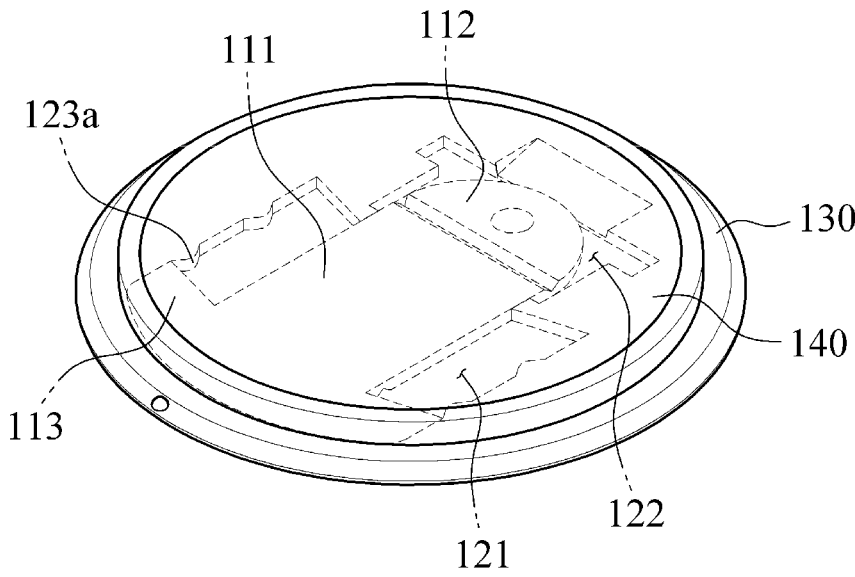
FIGS. 5 and 6 are perspective views for explaining the action between the strap and the guide plate.
Figure 6:
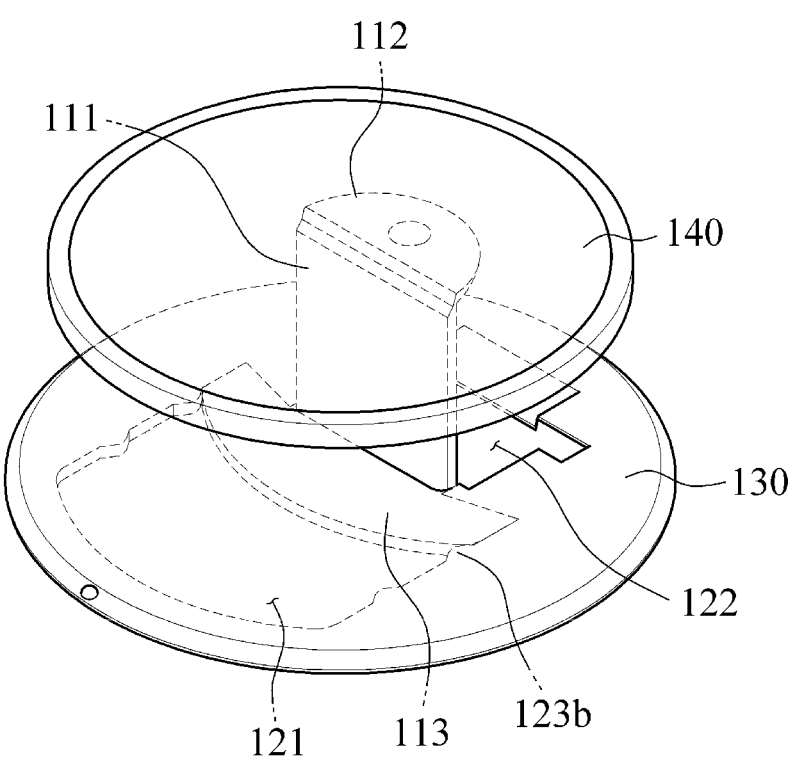
Figure 7:
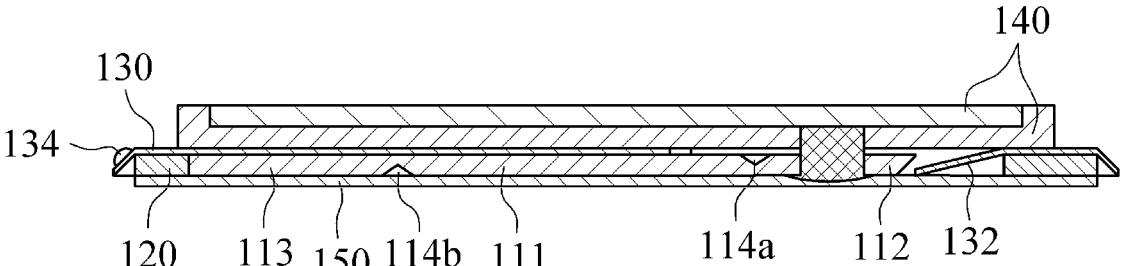
FIG. 7 is a partial cross-sectional view of FIG. 1.
Figure 8:
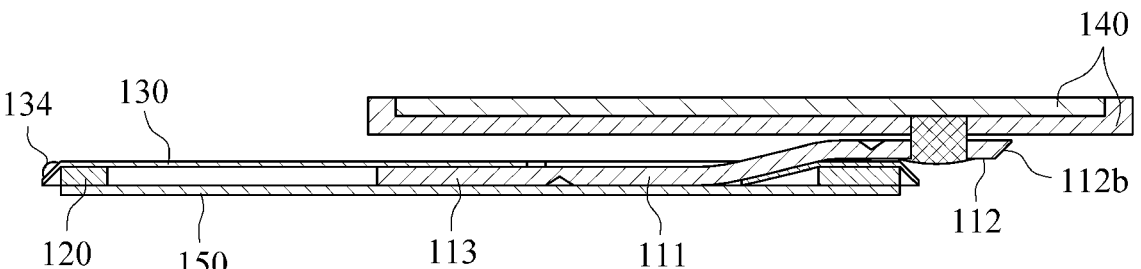
FIG. 8 is a cross-sectional view showing a drawing-out state of the strap in FIG. 7.

FIG. 1 is a perspective view of a holder for portable terminal according to an embodiment of the present invention. FIG. 2 is a perspective view showing a state in which the movable plate moves away from the holder case in FIG. 1 so that a finger can be inserted therein. FIG. 3 is a perspective view showing a state in which a part of the movable plate spaced apart from the holder case in FIG. 1 is inserted into the draw-out hole of the holder case. FIG. 4 is an exploded perspective view of FIG. 1. FIGS. 5 and 6 are perspective views for explaining the action between the strap and the guide plate. FIG. 7 is a partial cross-sectional view of FIG. 1. FIG. 8 is a cross-sectional view showing a drawing-out state of the strap in FIG. 7.

Referring to FIGS. 1 to 8, the holder 100 for portable terminal according to the present invention comprises a strap 110, a guide plate 120, a holder case 130, a marking part 134, a movable plate 140, and a holder cover 150.

The strap 110 is configured such that a fastening part 112 is formed at one end of the intermediate part 111, and a stopper part 113 is formed at the other end of the intermediate part 111. The strap 110 is made of a flexible material. Thus, the strap 110 operates so that it can bend and unfold. The strap 110 may be made of a material such as urethane, rubber, or silicone.

The intermediate part 111 of the strap 110 may be formed in a long elongated form with a constant width and thickness. The fastening part 112 may extend from one end of the intermediate part 111 in a semi-circular shape having the same diameter as the width of the intermediate part 111. The fastening part 112 may have the same thickness as the intermediate part 111. The fastening part 112 may have a fastening hole 112a for fastening with the movable plate 140. The fastening part 112 may have an inclined surface 112b by being chamfered along a lower edge. Therefore, the fastening part 112 can be smoothly drawn out from the draw-out hole 131 along the inclined part 132 of the holder case 130

The stopper part 113 may extend from the other end of the intermediate part 111 in a form of having hooks 113a protruding on both sides so as to be symmetrical on left and right sides with respect to the length direction of the intermediate part 111. The stopper part 113 may extend to the same width as the intermediate part 111 and may have the same thickness as the intermediate part 111.

The outer periphery of the stopper part 113 may be formed in a convexly curved shape as a whole. Each inner periphery of the hooks 113a may be formed in such a manner that the outer periphery of the stopper part 113 is inclined in a curved direction. For example, the stopper part 113 may be formed in the shape of an anchor. Therefore, the stopper part 113 can be increased in the area of making contact with the inner surface of the first guide hole of the guide plate 120 at the outermost position and the innermost position, respectively, thus ensuring stable support.

The strap 110 is configured such that a first bending groove 114a is formed on the upper surface of the boundary between the fastening part 112 and the intermediate part 111, and a second bent groove 114b is formed on the lower surface of the boundary between the intermediate part 111 and the stopper part 113. The first and second bending grooves 114a and 114b may be formed to have a constant width and depth along the width direction of the intermediate part 111.

The first bending groove 114a allows the intermediate part 111 to bend downward well with respect to the fastening part 112, and the second bending groove 114b allows the part 111 to bend upward well with respect to the stopper part 113, so that the movable plate 140 can be smoothly spaced apart from the holder case 130. Such a strap 110 can be manufactured by integrally molding the intermediate part 111, the fastening part 112, and the stopper part 113, and processing the fastening hole 112a, the inclined surface 112b, and the first and second bending grooves 114a and 114b.

The guide plate 120 has a first guide hole 121 and a second guide hole 122. The guide plate 120 may have a constant thickness. When the holder case 130 is formed in a circular shape, the guide plate 120 may be formed in a circular shape. The guide plate 120 may be made of a material such as urethane, rubber, or silicon.

The first guide hole 121 inserts the stopper part 113 to guide a movement of the stopper part 113 accompanied by a movement of the fastening part 112. The first guide hole 121 may have a certain width so as to guide a linear movement of the stopper part 113 in a state where the left and right outer surfaces of the stopper part 113 abut on the left and right inner surfaces of the first guide hole 121. The first guide hole 121 may be formed such that an inner surface facing the outer periphery of the stopper part 113 makes contact into the same shape as the outer peripheral shape of the stopper part 113. The first guide hole 121 may be formed so that the inner surfaces facing the inner periphery of the hooks 113a makes contact into the same shape as the inner peripheral shape of the hooks 113a.

First hooking protrusions 123a may be formed on inner surfaces of both sides of the first guide hole 121 to hook the stopper part 113 at the outermost position of the stopper part 113. Therefore, the stopper part 113 may be maintained in a state of being hooked by the first hooking protrusions 123a unless it receives a certain amount of force at the outermost position. As a result, the movable plate 140 can be maintained in a state of making contact with the holder case 130 at the outermost position of the stopper part 113.

Second hooking protrusions 123b may be formed on inner surfaces of both sides of the first guide hole 121 so as to hook the stopper part 113 at the innermost position of the stopper part 113. Therefore, the stopper part 113 can be maintained in a state of being hooked on the second hooking projections 123*b* unless it receives a certain amount of force at the innermost position. Protruding portions of the first and second hooking protrusions 123*a* and 123*b* may be formed in a convexly curved shape so that the stopper part 113 can pass over smoothly. As a result, the movable plate 140 can be maintained in a state of being spaced apart from the holder case 130 at the innermost position of the stopper part 113.

The second guide hole 122 has a width narrower than that of the first guide hole 121 and communicates with the first guide hole 121 to insert the fastening part 112 and guide a movement of the fastening part 112. The second guide hole 122 is formed symmetrically on left and right sides with respect to the center line of the first guide hole 121. The second guide hole 122 has a constant width in the moving direction of the fastening part 112.

The second guide hole 122 has a width wider than the width of the intermediate part 111 of the strap 110 and can smoothly guide the movement of the fastening part 112. The second guide hole 122 may have alignment protrusions 124 at left and right portions that are connected with the first guide hole 121 so as to minimize left and right shaking of the fastening part 112.

The holder case 130 houses the guide plate 120 and the strap 110 therein through a lower opening on the basis of the horizontal arrangement. The holder case 130 may have a structure in which a flange extends downward along the edge of the circular planar part. The holder case 130 may be made of a material such as plastic.

The holder case 130 has a draw-out hole 131 formed in correspondence with the second guide hole 122 on the upper surface to draw out the fastening part 112. The draw-out hole 131 may have the same width as the width of the second guide hole 122. An inner periphery of the draw-out hole 131 may coincide with an inner periphery of the second guide hole 122. The draw-out hole 131 has such a length that the outer periphery can be spaced apart from the end of the fastening part 112 at the outermost position.

The holder case 130 may have an inclined part 132 that is inclined upward in the draw-out direction of the fastening part 112 at an outer periphery of the draw-out hole 131 facing the end of the fastening part 112 to guide the drawing out of the fastening part 112. The inclined part 132 is formed in a shape in which the outer periphery of the draw-out hole 131 is formed in a recessed shape to be inclined downward, thereby being able to be inclined upward in the draw-out direction of the fastening part 112. Here, the second guide hole 122 may extend outward so as to house the inclined part 132. The draw-out hole 131 extends downward from the inside of the left and right sides and has guide pieces 133 facing the left and right surfaces of the fastening part 112, thereby being able to guide the drawing out of the fastening part 112. The left and right widths of the inclined part 132 may be narrower than the left and right widths of the draw-out hole 131.

The holder case 130 may include first extension holes 131*a* that extend to both sides from the outer edge of the draw-out hole 131 so as to insert a part of the movable plate 140 spaced apart from the holder case 130. The first extension holes 131*a* may have a constant width and be formed symmetrically on the left and right sides.

The marking part 134 indicates the draw-out direction of the fastening part 112. The marking part 134 may be formed protrusively from the rearmost edge of the holder case 130 in the draw-out direction of the fastening part 112. The marking part 134 may protrude in a hemispherical shape, but may protrude in various shapes or be formed concavely. As another example, the marking part 134 may be provided on the movable plate 140.

The guide plate 120 may comprise second extension holes 122*a* that extend to both sides of the second guide hole 122 in correspondence with the first extension holes 131*a* so that a part of the movable plate 140 spaced from the holder case 130 inserts into first extension holes 131*a*. The second extension holes 122*a* may be formed into the same shape as the first extension holes 131*a*.

The movable plate 140 is disposed on the upper surface of the holder case 130 and fastened to the fastening part 112 on the lower surface. When the holder case 130 is formed in a circular shape, the movable plate 140 may also be formed in a circular shape. The movable plate 140 operates apart from or in contact with the holder case 130 as the fastening part 112 is drawn out or returned through the draw-out hole 131.

The movable plate 140 may be configured by attaching the inner movable plate 140*a* and the outer movable plate 140*b* in a laminated state. The inner movable plate 140*a* may have a constant thickness and can be formed in a circular shape. The inner movable plate 140*a* may have a diameter smaller than that of the holder case 130. The inner movable plate 140*a* may be made of a material such as urethane, rubber, or silicon. The inner movable plate 140*a* may be fastened to the fastening hole 112*a* of the fastening part 112 by a rivet 141.

The inner movable plate 140*a* can seat the head of the rivet 141 by being recessed around the hole for mounting the rivet 141. The inner movable plate 140*a* may have a structure in which a flange extends downward along an edge. The inner movable plate 140*a* may house the outer movable plate 140*b* in a space surrounded by a flange.

The outer movable plate 140*b* may have a constant thickness. The outer movable plate 140*b* may be formed in a circular shape having a smaller diameter than the inner movable plate 140*a* and may be housed in a space surrounded by a flange of the inner movable plate 140*a*. The outer movable plate 140*b* may be made of a material such as urethane, rubber, or silicon. The outer movable plate 140*b* can display an advertisement on its surface by printing or the like to impart an advertising effect.

The holder cover 150 is attached to the guide plate 120 and the holder case 130 while the lower opening of the holder case 130 is closed. The holder cover 150 may have an inner upper surface attached to a lower surface of the guide plate 120 and an edge upper surface attached along a lower surface around the lower opening of the holder case 130. The holder cover 150 may be attached to the guide plate 120 and the holder case 130 by an adhesive or the like.

When the holder case 130 is formed in a circular shape, the holder cover 150 may be formed in a circular shape and attached along the periphery of the lower opening of the holder case 130. The holder cover 150 may be made of a material such as urethane, rubber, silicone, or plastic.

The outer surface of the holder cover 150 may be attached to the portable terminal 10 by a double-sided tape. Therefore, the holder 100 for portable terminal can be used by being attached to the portable terminal 10. When the mobile terminal 10 is covered with a protective case, the holder 100 for portable terminal may be attached to a protective case of the portable terminal 10.

A usage example of the holder 100 for portable terminal described above is as follows. Here, the case where the holder 100 for portable terminal is attached to the back surface of the protective case of the portable terminal 10 is mentioned as an example, but even when it is attached to the back surface of the portable terminal 10, it can be used in a similar manner.

First, the movable plate 140 stands by in a state of making contact with the center of the holder case 130. At this time, the stopper part 113 of the strap 110 is located on the outermost side of the first guide hole 121 of the guide plate 120. In this state, the user pushes the movable plate 140 toward the marking part 141 using a finger. Then, the fastening part 112 of the strap 110 fastened to the movable plate 140 is drawn out through the draw-out hole 131 of the holder case 130. Thereby, the stopper part 113 moves to the innermost side along the first guide hole 121.

Figure 9:
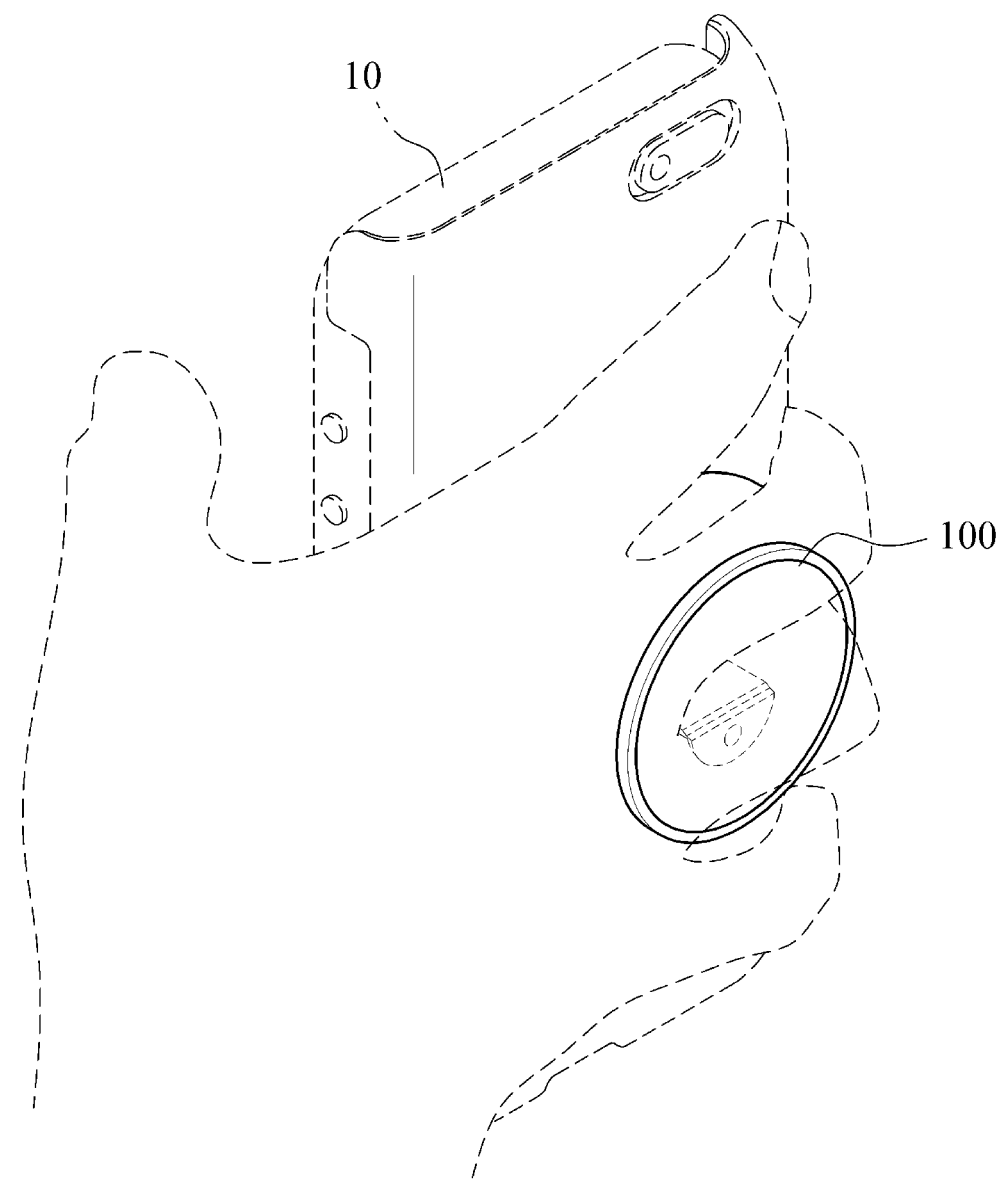
FIG. 9 is a diagram showing an example in which a holder for portable terminal is used so that the user can hold the portable terminal.

In this state, when the user lifts the movable plate 140 from the holder case 130, there may be a space between the movable plate 140 and the holder case 130. Then, as shown in FIG. 9, the user inserts a finger into the space between the movable plate 140 and the holder case 130 with the intermediate part 111 of the strap 110 being interposed therebetween. Thereby, the user can stably grip and use the portable terminal 10.

After that, when the movable plate 140 no longer needs to be used in the above-mentioned shape, the user pushes the movable plate 140 toward the center of the holder case 130. Then, the fastening part 112 is pushed in through the draw-out hole 131 of the holder case 130. Consequently, the stopper part 113 moves to the outermost side along the first guide hole 121. Then, the movable plate 140 returns to the state of being in contact with the center of the holder case 130. Accordingly, the holder 100 for portable terminal is minimized in its overall volume when not in use, which may be advantageous to store the portable terminal 10 in a pocket or the like.

Figure 10:
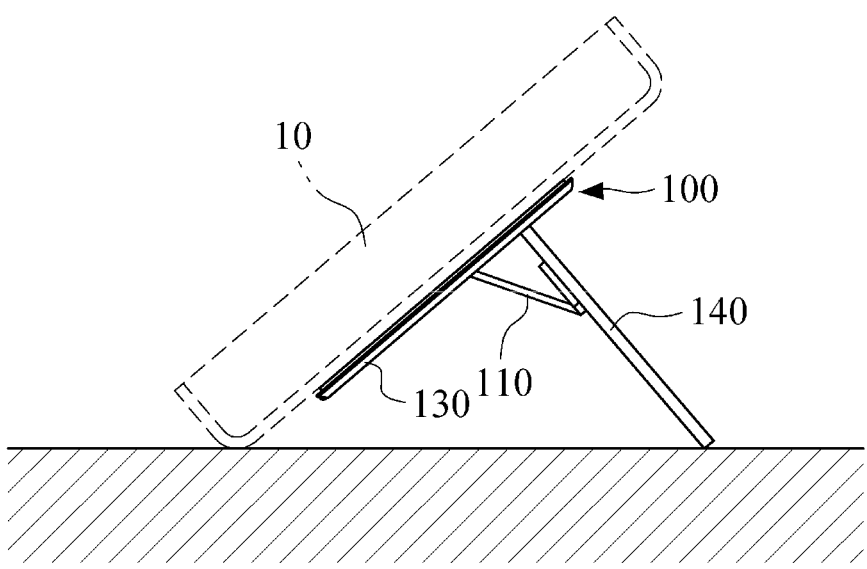
FIG. 10 is a diagram illustrating an example in which a holder for portable terminal is used so that the portable terminal can be mounted on the floor.

As another example, as shown in FIG. 10, the user separates the movable plate 140 from the holder case 130 through the above procedures, and then inserts one side portion of the movable plate 140 closer to the fastening part 112 into the draw-out hole 131 of the holder case 130. In this state, if the user places the opposite side portion of the movable plate 140 on the floor with the back surface of the movable plate 140 facing the floor, the portable terminal 10 may be mounted on the floor in an inclined state.

As described above, the holder 100 for mobile terminal of the present embodiment can reduce the overall volume by overlapping the movable plate 140 with the holder case 130 when not in use, and the movable plate 140 is separated from the holder case 130 only when in use, thus allowing the user to grip the portable terminal 10 more stably.

Further, the portable terminal holder 100 of the present embodiment is inserted into the draw-out hole 131 side of the holder case 130 in a state where the movable plate 140 is separated from the holder case 130 as necessary, so that the mobile terminal 10 can be conveniently mounted on the floor.

Figure 11:
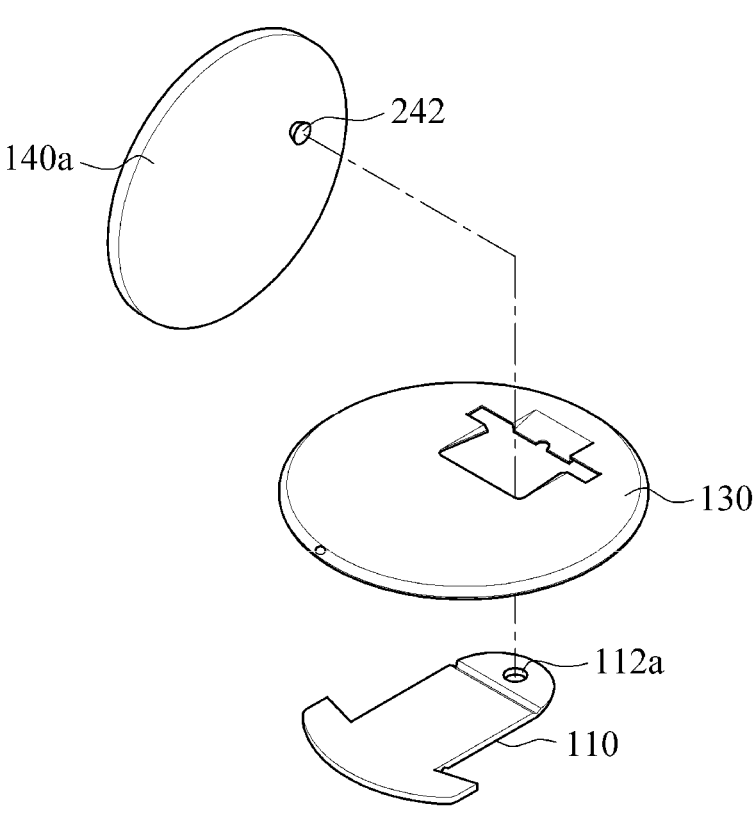
FIG. 11 is an exploded perspective view showing another example in which a fastening part of a strap is fastened to a movable plate.
Figure 12:
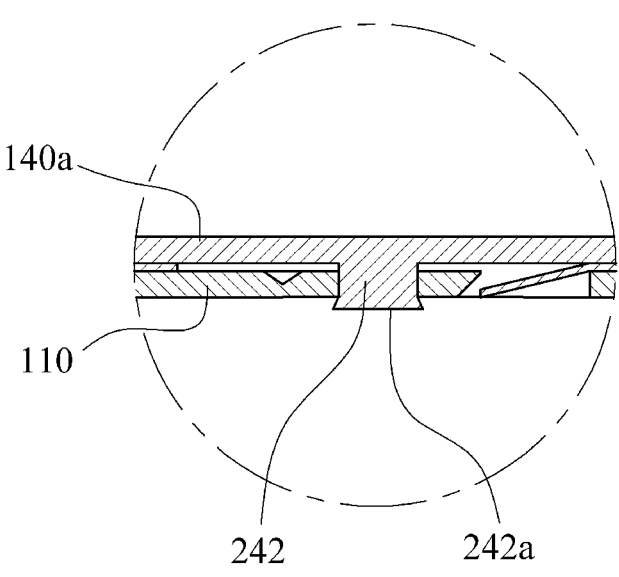
FIG. 12 is a cross-sectional view of FIG. 11.

FIG. 11 is an exploded perspective view showing another example in which a fastening part of a strap is fastened to a movable plate. FIG. 12 is a cross-sectional view of FIG. 11.

Referring to FIGS. 11 and 12, a fastening pole 242 may be formed on the lower surface of the movable plate 140, that is, the inner movable plate 140a. The fastening pole 242 may have a hooking head 242a at a protruding end. The locking head 242a may be formed in an extended form while gradually inclining from the protruding end of the hooking pole 242. When the hooking head 242a passes through the fastening hole 112a of the fastening part 112 and is hooked around the fastening hole 112a, so that the fastening pole 242 can be prevented from being separated from the fastening part 112. Accordingly, the movable plate 140 may be fastened to prevent separation from the fastening part 112 by the fastening pole 242. A seating groove for seating the hooking head 242a may be formed around the upper surface of the fastening hole 112a.

Figure 13:
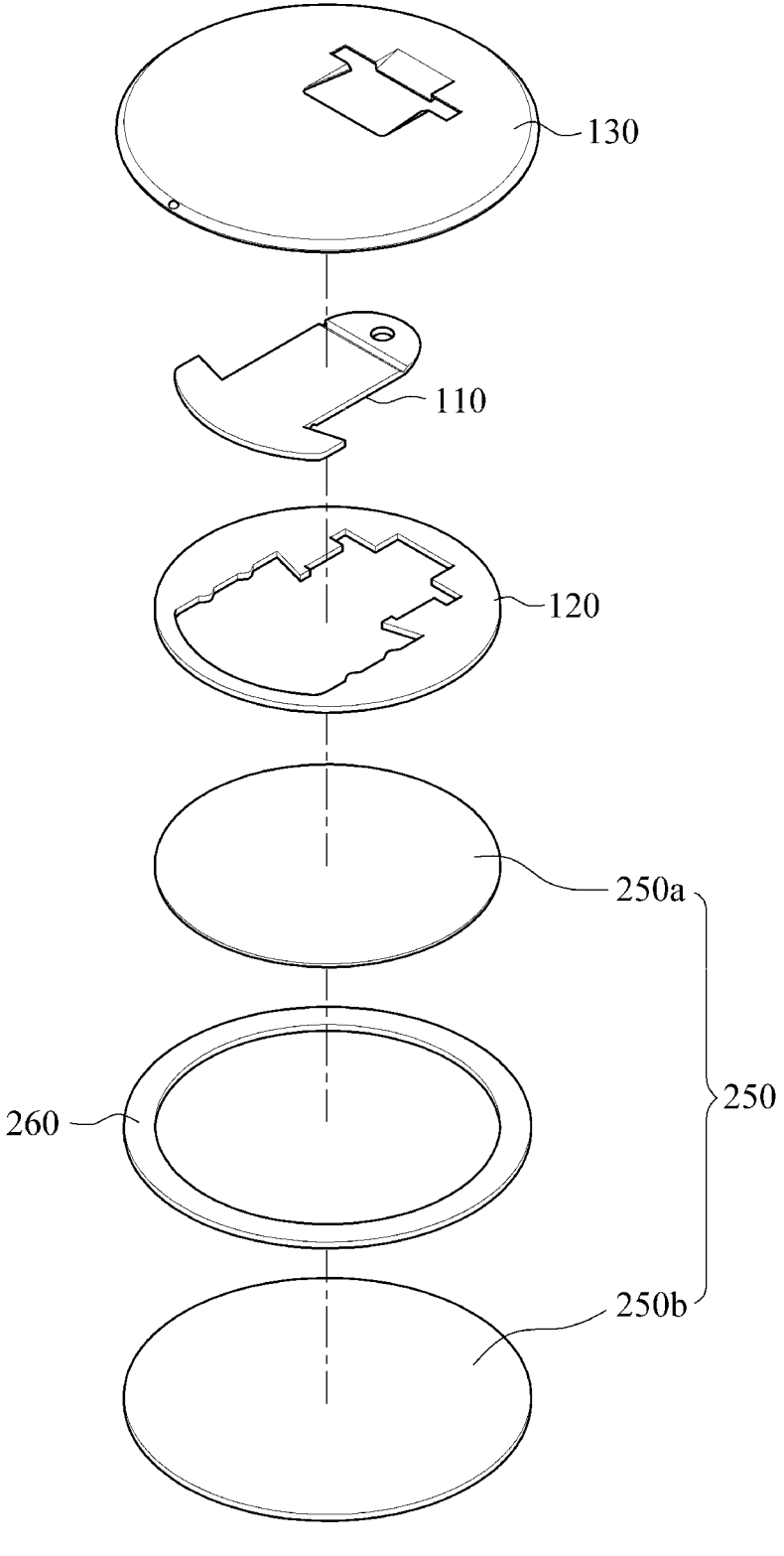
FIG. 13 is an exploded perspective view showing an example in which a permanent magnet is housed in a holder case.
Figure 14:
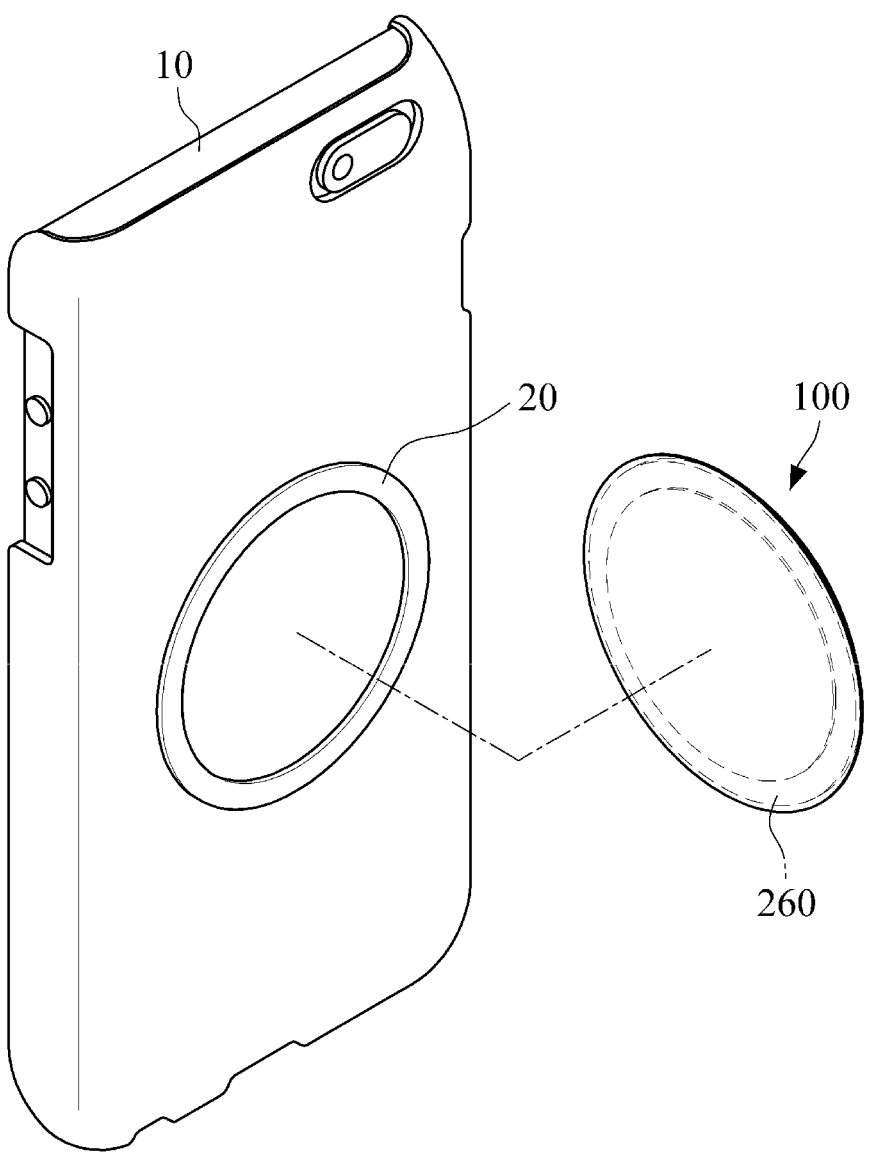
FIG. 14 is a perspective view showing an example in which the holder for portable terminal in FIG. 13 is used by being attached to the portable terminal by a permanent magnet.

FIG. 13 is an exploded perspective view showing an example in which a permanent magnet is housed in a holder case. FIG. 14 is a perspective view showing an example in which the holder for portable terminal in FIG. 13 is used by being attached to the portable terminal by a permanent magnet.

Referring to FIGS. 13 and 14, the permanent magnet 260 may be disposed between the inner periphery of the holder case 230 and the outer periphery of the guide plate 120 and attached to the upper surface of the holder cover 250. The permanent magnet 260 may be formed in a ring shape having a constant thickness.

The holder case 230 may have a diameter larger than the holder case 130 of the above-mentioned example so that the permanent magnet 260 can be disposed in a state of being spaced apart from the guide plate 120. The holder cover 250 may be configured by attaching the inner cover 250a and the outer cover 250b in a laminated state. The inner cover 250a may have the same diameter as the guide plate 120. The inner cover 250a may have a constant thickness. The inner cover 250a may be made of a material such as urethane, rubber, silicone, or plastic. The upper surface of the inner cover 250a may be attached to the lower surface of the guide plate 120 by an adhesive or the like.

The outer cover 250b may have the same diameter as the lower opening of the holder case 230. The outer cover 250b may have a constant thickness. The outer cover 250b may be configured such that an adhesive layer is formed as a whole on one side, and the adhesive layer is protected by a backing paper. For example, the outer cover 250b may be made of an adhesive tape. The outer cover 250b may be provided by cutting an adhesive tape so that it has the same diameter as the lower opening of the holder case 230. The outer cover 250b is formed by bonding the adhesive layer to the lower surface of the inner cover 250a and the lower surface of the permanent magnet 260, thereby being able to cover the lower opening of the holder case 230.

In this manner, when the holder 100 for portable terminal incorporates the permanent magnet 260, a magnetic material capable of magnetically bonding to the permanent magnet 260, for example, a magnetic metal ring 20 may be attached to the rear surface of the portable terminal 10. Therefore, the holder 100 for portable terminal can be easily detachably attached to the mobile terminal 10 according to attachment and detachment between the permanent magnet 260 and the magnetic metal ring 20. Even when the magnetic metal ring 20 is attached to the back surface of the protective case of the portable terminal 10, the holder 100 for portable terminal can be easily detachably attached to the protective case of the portable terminal 10.

Although some embodiments have been provided to illustrate the present invention in conjunction with the accompanying drawings, it will be apparent to those skilled in the art that the embodiments are given by way of illustration only, and that various modifications and equivalent embodiments can be made without departing from the spirit and scope of the present invention. Accordingly, the scope and spirit of the present invention should be limited only by the following claims.

[Explanation of Symbols]

| | |
|---|---|
| 10. portable terminal | 20. magnetic metal ring |
| 100. holder for mobile terminal | |
| 110. strap | 111. intermediate part |
| 112. fastening part | 112a. fastening hole |
| 112b. inclined surface | 113. stopper part |
| 113a. hook | 114a. first bending groove |
| 114b. second bending groove | 120. guide plate |
| 121. first guide hole | 122. second guide hole |
| 122a. second extension hole | 123a. first hooking protrusion |
| 123b. second hooking protrusion | 124. alignment protrusion |
| 130, 230. holder case | 131. draw-out hole |
| 131a. first extension hole | 132. inclined part |
| 133. guide piece | 134. marking part |
| 140. movable plate | 140a. inner movable plate |
| 140b. outer movable plate | 141. rivet |
| 150, 250. holder cover | 242. fastening pole |
| 242a. hooking head | 250a. inner cover |
| 250b. outer cover | 260. permanent magnet |

What is claimed is:

1. A holder for portable terminal comprising:

a strap in which a fastening part is formed at one end of the intermediate part, and a stopper part is formed at the other end of the intermediate part, a guide plate that comprises a first guide hole inserting the stopper part and guiding a movement of the stopper part accompanied by a movement of the fastening part, and a second guide hole having a width narrower than that of the first guide hole, communicating with the first guide hole, inserting the fastening part and guiding a movement of the fastening part, a holder case which comprises a draw-out hole that houses the guide plate and the strap therein through a lower opening on the basis of a horizontal arrangement, and is formed on the upper surface to correspond to the second guide hole to draw out the fastening part;

a marking part that indicates a draw-out direction of the fastening part;

a movable plate that is disposed on the upper surface of the holder case and fastened to the fastening part on the lower surface, and that operates away from or into contact with the holder case as the fastening part is drawn out or returned through the draw-out hole; and a holder cover that is attached to the guide plate and the holder case while closing the lower opening of the holder case, wherein the guide plate comprises:

first hooking protrusions formed on inner surfaces of both sides of the first guide hole so as to hook the stopper part at the outermost position of the stopper, and second hooking protrusions formed on inner surfaces of both sides of the first guide hole so as to hook the stopper part at the innermost position of the stopper part.

2. The holder for portable terminal of claim 1, wherein:

the holder case comprises an inclined portion that is inclined upward in a draw-out direction of the fastening part at an outer periphery of the draw-out hole facing the end of the fastening part to guide the drawing out of the fastening part.

3. The holder for portable terminal of claim 1, further comprising:

a permanent magnet disposed between the inner periphery of the holder case and the outer periphery of the guide plate and attached to the upper surface of the holder cover.

4. A holder for portable terminal comprising:

a strap in which a fastening part is formed at one end of the intermediate part, and a stopper part is formed at the other end of the intermediate part, a guide plate that comprises a first guide hole inserting the stopper part and guiding a movement of the stopper part accompanied by a movement of the fastening part, and a second guide hole having a width narrower than that of the first guide hole, communicating with the first guide hole, inserting the fastening part and guiding a movement of the fastening part, a holder case which comprises a draw-out hole that houses the guide plate and the strap therein through a lower opening on the basis of a horizontal arrangement, and is formed on the upper surface to correspond to the second guide hole to draw out the fastening part;

a marking part that indicates a draw-out direction of the fastening part;

a movable plate that is disposed on the upper surface of the holder case and fastened to the fastening part on the lower surface, and that operates away from or into contact with the holder case as the fastening part is drawn out or returned through the draw-out hole; and a holder cover that is attached to the guide plate and the holder case while closing the lower opening of the holder case, wherein:

the holder case comprises first extension holes that extend to both sides from an outer edge of the draw-out hole so as to insert a part of the movable plate spaced apart from the holder case, and the guide plate comprises second extension holes that extend to both sides of the second guide hole in correspondence with the first extension holes so as to insert a part of the movable plate spaced apart from the holder case together with the first extension holes.

* * * * *